(12) United States Patent
Lomnitz et al.

(10) Patent No.: US 7,974,178 B2
(45) Date of Patent: Jul. 5, 2011

(54) PILOT METHOD FOR 802.16M

(75) Inventors: Yuval Lomnitz, Herzelia (IL); Huaning Niu, Milpitas, CA (US); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 12/415,938

(22) Filed: Mar. 31, 2009

(65) Prior Publication Data

US 2010/0246696 A1    Sep. 30, 2010

(51) Int. Cl.
*H04J 11/00* (2006.01)
*H04J 1/00* (2006.01)

(52) U.S. Cl. .................................. 370/208; 370/480
(58) Field of Classification Search .............. 370/203, 370/206, 208, 329, 344, 480; 375/130, 132, 375/133, 135, 136, 259, 260; 455/450, 453, 455, 464

See application file for complete search history.

(56) References Cited

U.S. PATENT DOCUMENTS

| | | | |
|---|---|---|---|
| 6,947,748 B2 * | 9/2005 | Li et al. ...................... 455/450 |
| 7,889,633 B2 * | 2/2011 | Noh et al. .................... 370/208 |
| 2007/0058752 A1 * | 3/2007 | Ke ............................... 375/316 |
| 2010/0020890 A1 * | 1/2010 | Choi et al. ................... 375/260 |
| 2010/0278221 A1 * | 11/2010 | Qi et al. ....................... 375/219 |
| 2011/0096867 A1 * | 4/2011 | Kang et al. ................... 375/295 |

* cited by examiner

*Primary Examiner* — Aung S Moe
*Assistant Examiner* — Feben Haile
(74) *Attorney, Agent, or Firm* — Carrie A. Boone, P.C.

(57) ABSTRACT

A novel pilot method employs a cluster having a particular arrangement of pilot sub-carriers to optimize transmissions under 802.16 m, or WiMAX-II. The optimally configured cluster features equal pilot density per OFDM symbol, two or more pilot sub-carriers per cluster, and interlaced pilot sub-carriers, which enables the base stations to successfully boost the pilot sub-carriers, for optimum performance.

15 Claims, 9 Drawing Sheets

PILOT METHOD FOR 802.16M

TECHNICAL FIELD

This application relates to worldwide interoperability for microwave access (WiMAX) and, more particularly, to a methodology for pilot sub-carriers that is optimized for WiMAX-II.

BACKGROUND

WiMAX, or WiMAX-I, is based on the IEEE (Institute of Electrical and Electronics Engineers) 802.16e standard. WiMAX-I employs orthogonal frequency division multiple access (OFDMA) for transmissions, resulting in improved multi-path performance in non-line-of-sight environments. WiMAX-I may employ single-user (SU) or multiple-user (MU) multiple-input multiple output (MIMO) antenna techniques, adaptive modulation and coding schemes, and flexible subchannelization. A new generation of WiMAX, termed 802.16m or WiMAX-II, is currently under development.

Under 802.16m, a symbol is used for various physical layer (PHY) functionalities, such as different MIMO modes, interference mitigation, and so on. The symbol structure includes two parts: the subchannelization design and the pilot design. An OFDMA symbol is made up of sub-carriers, divided into data sub-carriers, pilot sub-carriers, and null sub-carriers (e.g., guard band). Subchannelization schemes divide the available sub-carriers into groups called sub-channels.

There exists a need for a pilot design that is optimized for the 802.16m (WiMAX-II) standard.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a novel pilot method is disclosed. The pilot method employs a cluster having a particular arrangement of pilot sub-carriers to optimize transmissions under 802.16m, or WiMAX-II. The optimally configured cluster features equal pilot density per OFDM symbol, and interlaced pilot sub-carriers, which enables the base stations to successfully boost the pilot sub-carriers, for optimum performance.

Figure 1:
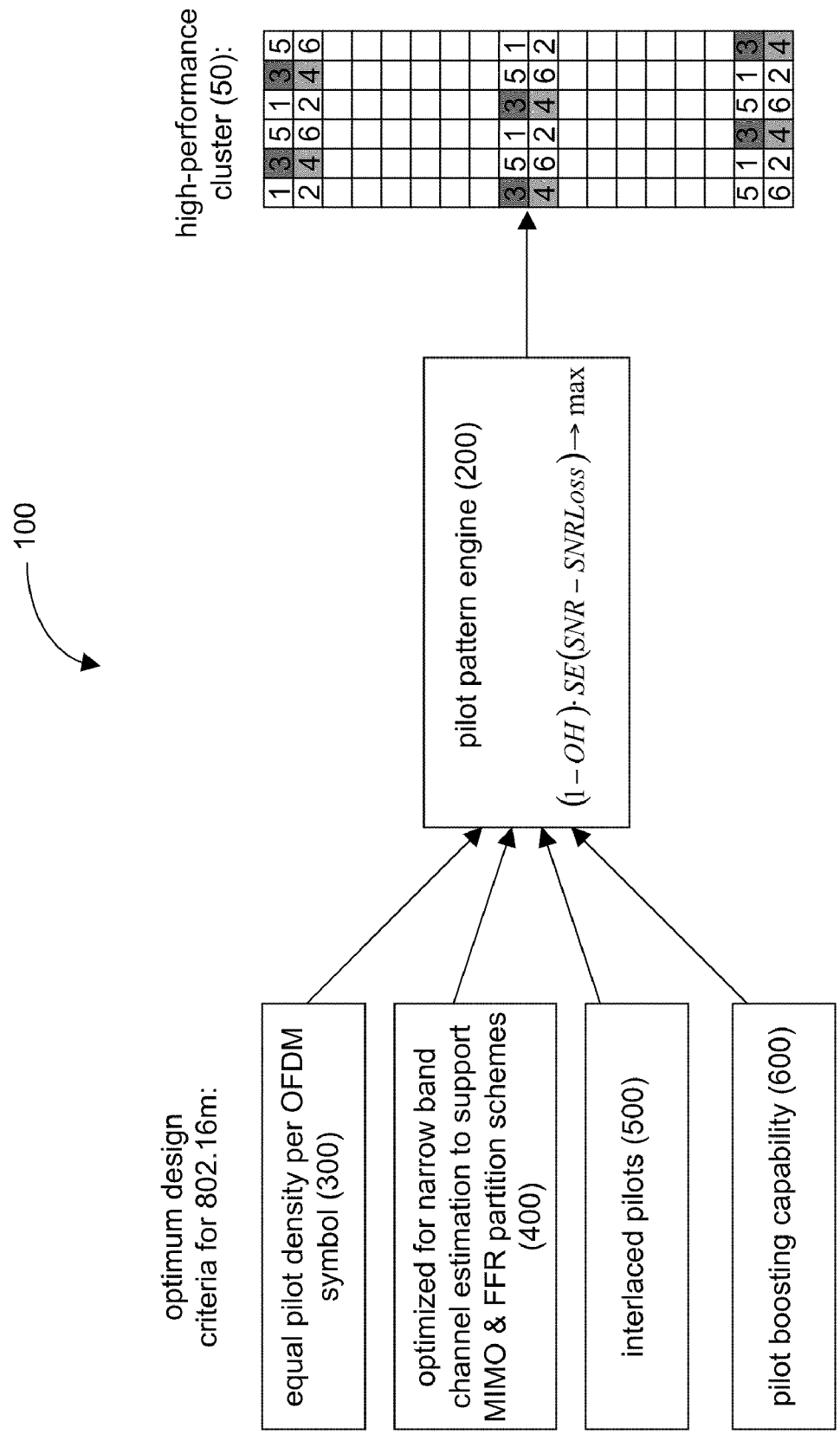
FIG. 1 is a block diagram of a pilot method, according to some embodiments.

FIG. 1 is a block diagram of a pilot method 100, according to some embodiments. The pilot method 100 may be implemented in the latest WiMAX proposal, 802.16m. The pilot method 100 includes a pilot pattern engine 200, which takes design criteria for 802.16m and generates a cluster 50 having optimal pilot patterns, to enable high-performance transmissions, in some embodiments. The pilot pattern engine 200 may be implemented in software, hardware, or both. In some embodiments, the pilot pattern engine 200 is software-based, but includes both automatic and manual (human-based) operations. The pilot method 100 is further described in FIGS. 3-8, below.

Figure 2:
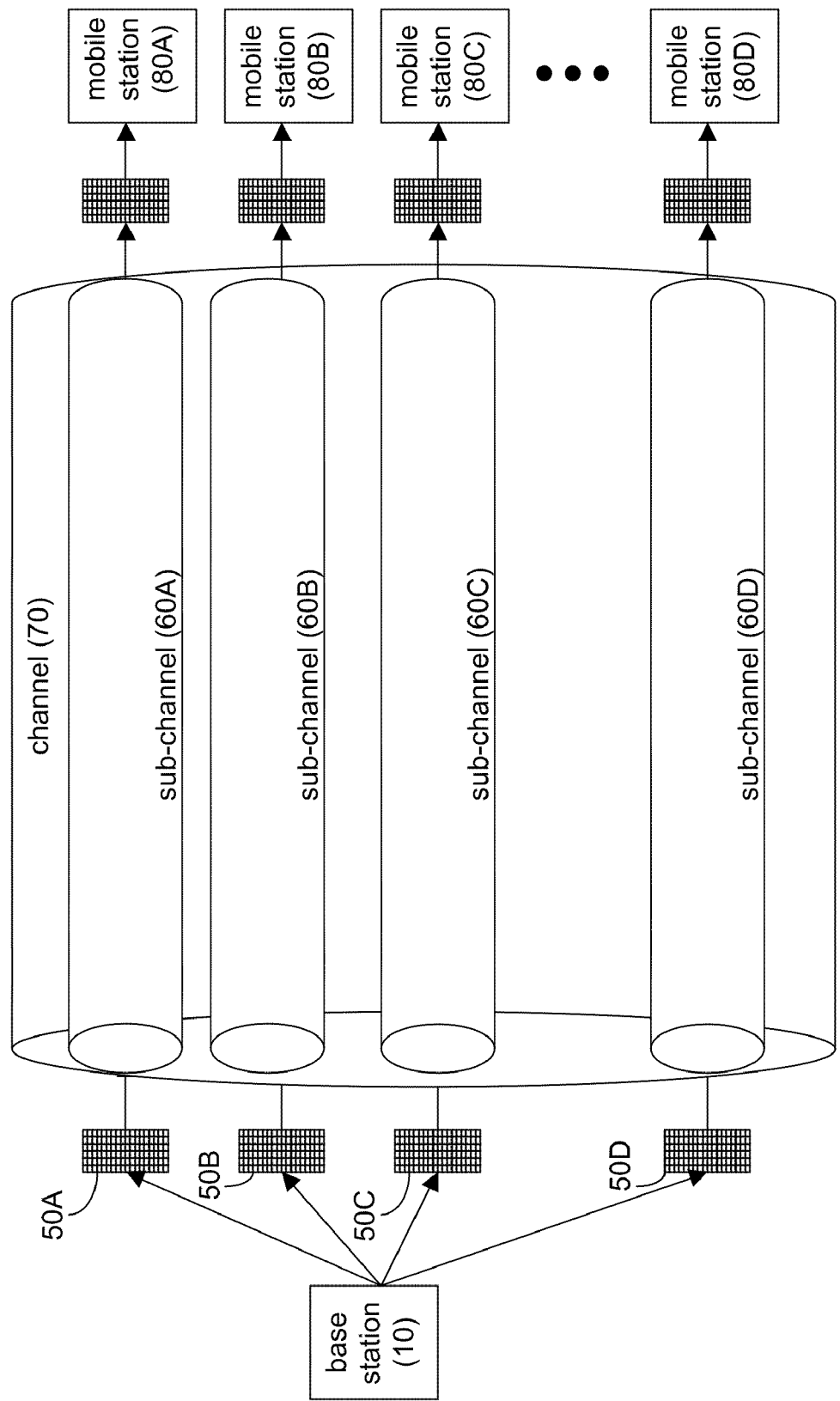
FIG. 2 is a block diagram of a network environment in which the pilot method of FIG. 1 is used, according to some embodiments.

Before describing the pilot method 100 in detail, some discussion of the environment is appropriate. FIG. 2 is a block diagram of part of a cellular neighborhood 150, including a base station (transmission) 10 and several mobile (subscriber) stations (reception) 80A, 80B, 80C, and 80D (collectively, mobile stations 80), along with clusters 50A, 50B, 50C, and 50D (collectively, clusters 50). The base station 10 transmits both pilot sub-carriers and data sub-carriers using a pre-defined cluster 50, as described further below. Transmissions between the base station 10 and the mobile stations 80 take place over a channel 70. In some embodiments, the pilot method 100 is used on a 10 MHz channel. In FIG. 2, multiple sub-channels 60A, 60B, 60C, and 60D (collectively, sub-channels 60), also known as resource units, may simultaneously be used to independently transmit data across the channel 70. Thus, using a first cluster 50A, the base station 10 may transmit data over a first sub-channel 60A to a first mobile station 80A; using a second cluster 50B, the base station 10 may transmit data over a second sub-channel 60B to a second mobile station 80B; using a third cluster 50C, the base station 10 may transmit data over a third sub-channel 60C to a third mobile station 80C; and using a fourth cluster 50D, the base station 10 may transmit data over a fourth sub-channel 60D to a fourth mobile station 80D.

Figure 3:
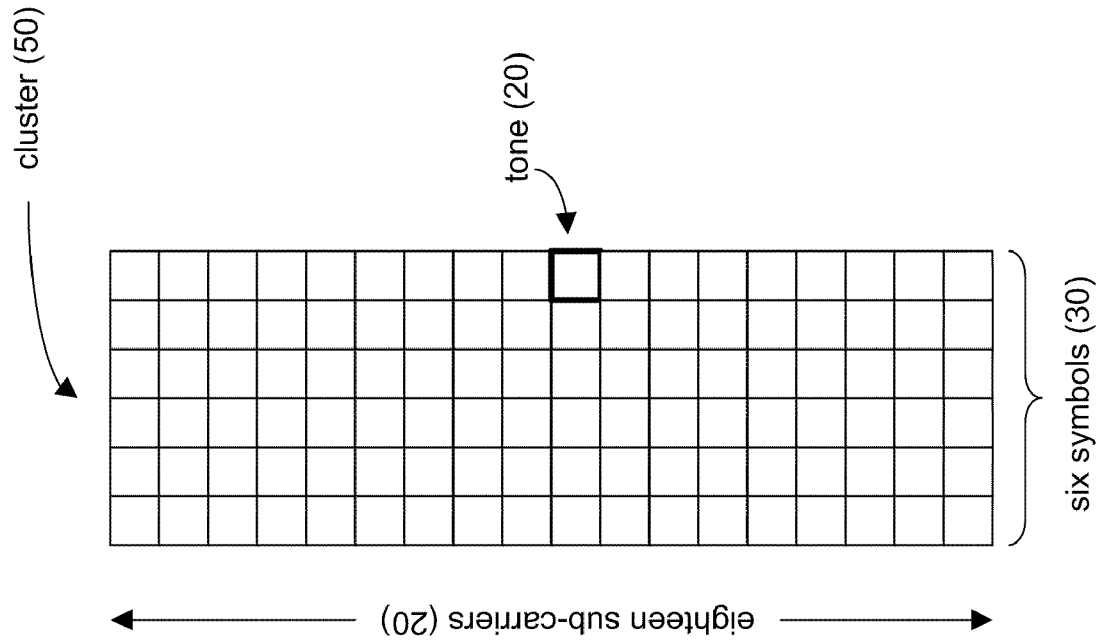
FIG. 3 is a block diagram of a cluster used by the pilot method of FIG. 1, according to some embodiments.

FIG. 3 is a block diagram of a cluster 50 used by the pilot method 100 of FIG. 1 to transmit data under 802.16m. In some embodiments, the pilot method 100 employs an 18×6 cluster size (eighteen sub-carriers by six symbols), to transmit data over a 10 MHz channel 70. The 18×6 cluster 50 includes 18 sub-carriers or tones 20 spanned over six OFDM symbol periods or symbols 30. The cluster 50 includes at least one dedicated pilot sub-carrier and one or more data sub-carriers. The preferred arrangement of pilot and data sub-carriers within the cluster 50, for different scenarios, is described further below. In some embodiments, the cluster 50 may be used for a single-pilot stream, two pilot streams, three pilot streams, and four pilot streams. Each stream 60 is transmitted through the channel 70, as shown in FIG. 2.

In establishing a new pilot design, the pilot method 100 considers channel estimation, channel quality indicator (CQI) estimation, frequency offset, and interference estimation for receiver interference mitigation. The pilot method 100 is specifically designed for 802.16m-supported environments, such as fractional frequency reuse (FFR) and multipleinput-multiple-output (MIMO) designs, of either the single-user (SU) or multiple-user (MU) variety.

In some embodiments, using the pilot method 100, pilot sub-carriers are dedicated to localized users and are common to distributed groups. For pre-coded transmissions, the number of pilot streams is equal to the number of data streams, and is not based on the number of transmit antennas. For other distributed schemes, such as the staggered Alamouti scheme, which transmits two data streams with four antennas, the number of pilot streams is equal to the number of antennas.

FIGS. 4-7 are diagrams used to illustrate the design criteria of the pilot method 100 of FIG. 1. The pilot pattern engine 200 generates clusters 50 having particular pilot patterns for optimal transmissions, based on the environment in which the cluster is to be used. FIG. 8 describes how the pilot pattern engine 200 derives these optimal clusters.

Figure 4:
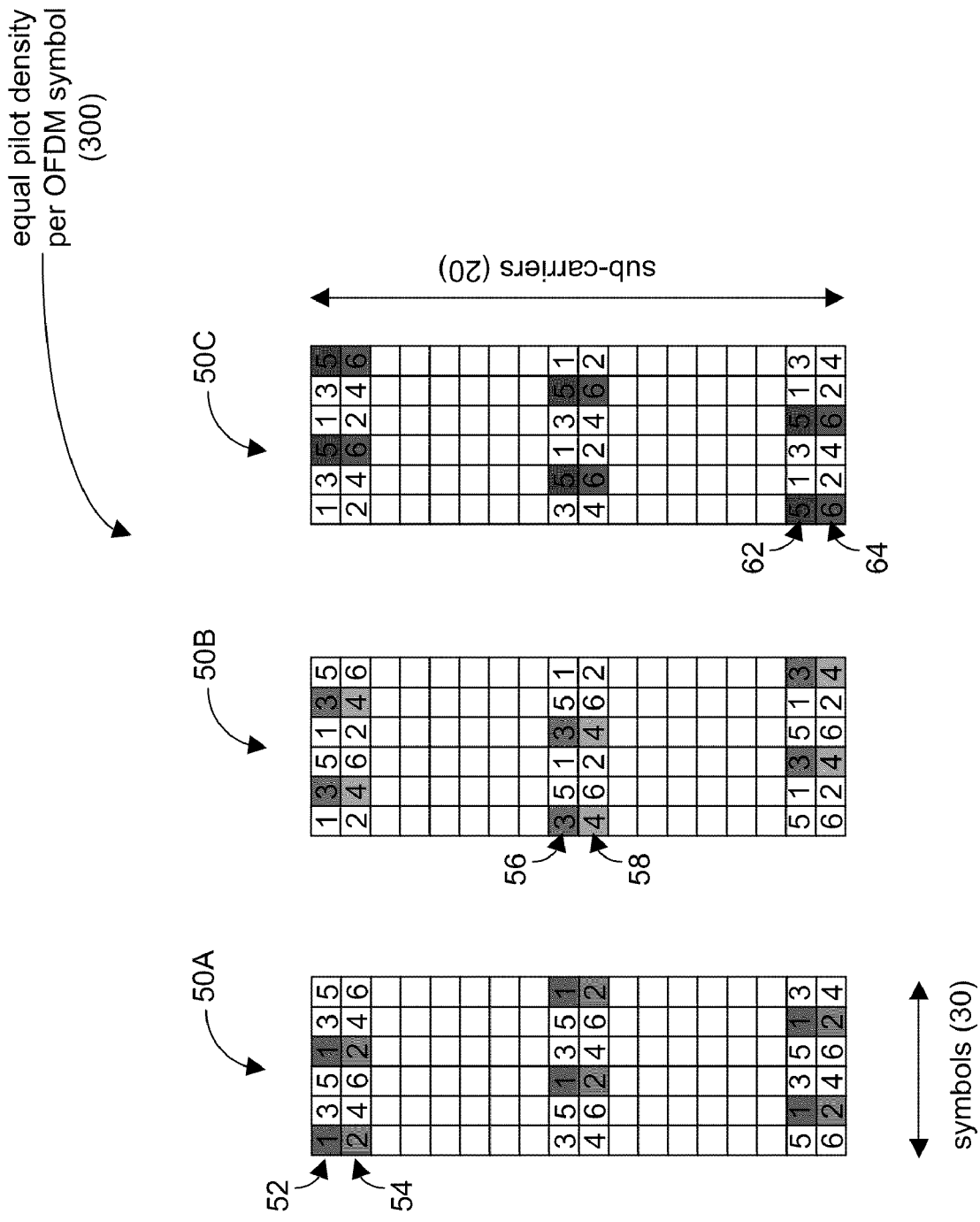
FIG. 4 is a block diagram illustrating the equal pilot sub-carrier density per OFDM symbol of the pilot method of FIG. 1, according to some embodiments.

FIG. 4 a block diagram depicting three clusters 50A, 50B, and 50C (collectively, clusters 50), according to some embodiments. Cluster 50A includes two pilot sub-carriers per OFDM symbol 52, 54; cluster 50B includes two pilot sub-carriers per OFDM symbol 56, 58; cluster 50C includes two pilot sub-carriers per OFDM symbol 62, 64. Each cluster 50 includes eighteen sub-carriers 20 over six symbols 30. Within each symbol period (e.g., column) of the cluster 50, two of the eighteen sub-carriers 20 are pilot sub-carriers (colored squares), while the remaining sub-carriers are data-sub-carriers, used to transmit data.

In the pilot method 100, the clusters 50A, 50B, and 50C include a 5.5% overhead per antenna (six pilot sub-carriers within the 18×6 cluster 50). Further, the number of pilot sub-carriers per symbol is either one or two. A total of six patterns are designed for two per sector (MIMO 2×2) with three sectors shown in three colors.

The pilot method 100 uses design criteria, which are particularly suited to performance-improving transmission schemes, such as MIMO and FFR, in some embodiments. For one, the cluster 50 used by the pilot method 100 features equal pilot density per OFDM symbol. This minimizes the power fluctuation and increases the power efficiency, in some embodiments, as well as minimizing the power fluctuation across antennas for multiple-antenna-per-stream transmissions.

Each cluster 50A, 50B, 50C includes two pilot sub-carriers per OFDM symbol 52, 54, 56, 58, and 62, 64, respectively. The pilot sub-carriers are used by the mobile station (receiver) 80 to estimate the channel. The data sub-carriers surrounding the pilot sub-carrier are somewhat correlated to the pilot sub-carrier, while the data sub-carriers farther away from the pilot sub-carrier are less so correlated. Therefore, for cluster 50A, the pilot sub-carriers 52, 54 are each found in each symbol period (column). Further, each pilot sub-carrier 52, 54 is distributed in a balanced manner, such that each data sub-carrier may be correlated to one of the pilot sub-carriers. For example, in the first symbol period, the pilot sub-carriers are in the first two positions, with eighteen data sub-carriers following. In the second symbol, the two pilot sub-carriers are in the last two positions, with the eighteen data sub-carriers preceding the pilots. In the third symbol, the two pilot sub-carriers are positioned in the middle, with eight data sub-carriers preceding and eight data sub-carriers following the pilot sub-carriers. From the position of any data sub-carrier, the pilot sub-carriers 52, 54 are not more than four positions away. Likewise, for clusters 50B and 50C, the pilot sub-carriers 56, 58 and 62, 64, respectively, are distributed in a balanced manner within each symbol period 30.

Given the pilot sub-carrier location, the mobile station 80 may estimate the channel characteristics one symbol at a time. In some embodiments, however, the channel estimation is done based on the entire cluster, including six symbol periods rather than one. Because of the strategic distribution of the pilot sub-carriers through the cluster 50, a better channel estimate may be obtained when analyzing the entire cluster than when only a single symbol period is analyzed, in some embodiments.

In FIG. 4, each cluster 50A, 50B, and 50C is associated with a different base station 10. Thus, cluster 50A is used by base station 10A, cluster 50B is used by base station 10B, and cluster 50C is used by base station 10C. However, each of the base stations 10 is likely to service more than one mobile, or subscriber station 80. Accordingly, the pilot method 100 defines each 18×6 cluster 50 to include two pilot sub-carriers. The pilot sub-carriers are distributed to achieve approximately an equal density of pilot sub-carriers across the 18×6 cluster 50, with a total of 108 sub-carriers, of which twelve are pilot sub-carriers (about 11%).

Figure 5:
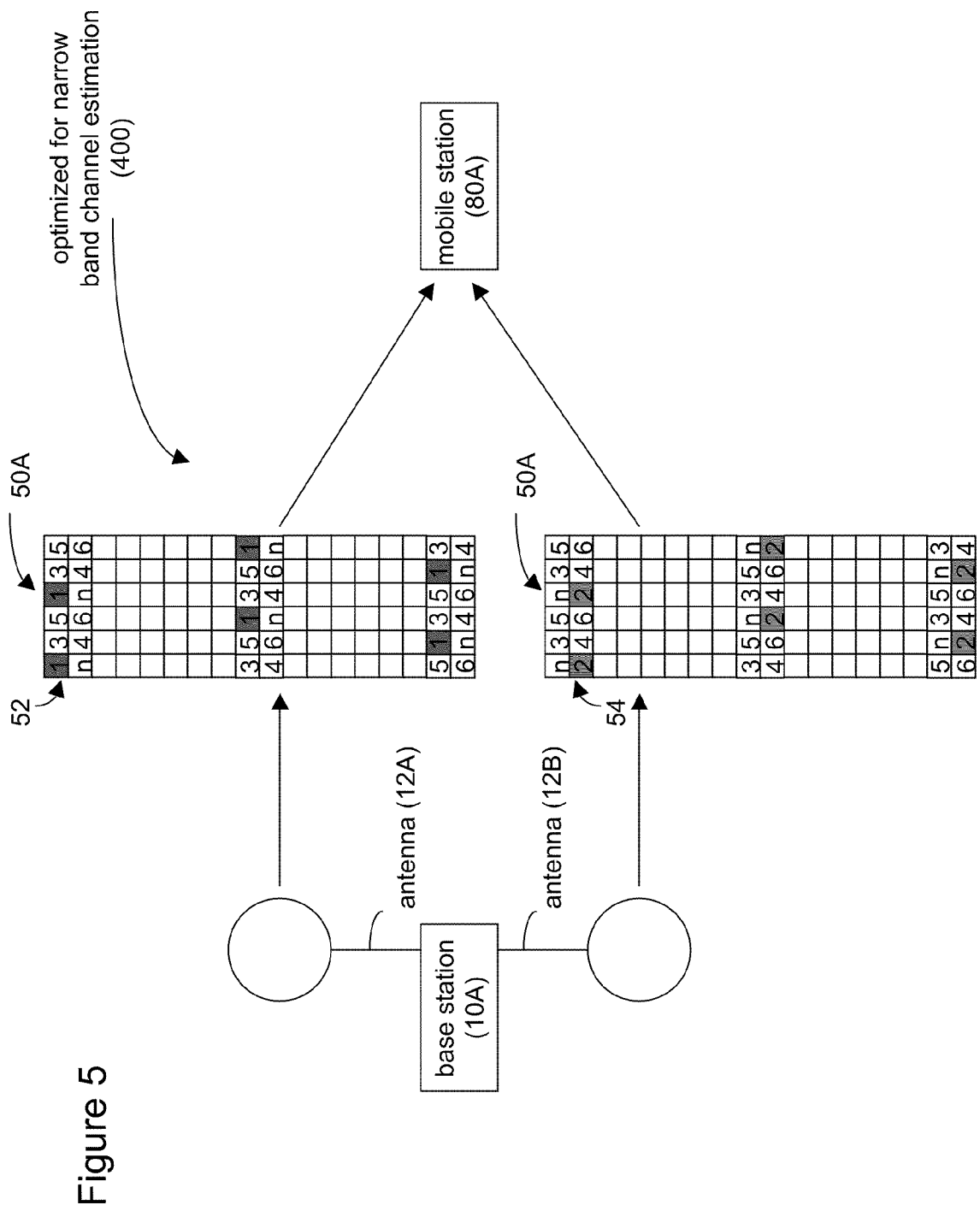
FIG. 5 is a block diagram how two pilot sub-carriers are used by a base station to simultaneously transmit two data streams to one mobile station by the pilot method of FIG. 1, according to some embodiments.

FIG. 5 illustrates how the two different pilot sub-carriers are used by the base station 10 to simultaneously transmit two different streams of data to a single mobile station 80A, in some embodiments. In the illustration, the base station 10A has two antennas 12A and 12B. The first antenna 12A transmits the cluster 50A with the first pilot sub-carriers 52 (red) and one set of data (the blank squares are data sub-carriers) while the second antenna 12B transmits the cluster 50A with the second pilot sub-carriers 54 (orange) and a new set of data. Where the first antenna 12A is transmitting the cluster 50A, the second pilot sub-carriers 54 are replaced by nulls (given by "n"); likewise, when the second antenna 12B is transmitting the cluster 50A, the first pilot sub-carriers 52 are replaced by nulls. Thus, the same cluster 50A is used for both transmissions, but the pilot sub-carriers 52, 54 are dedicated to particular transmissions by the base station 10A. For simplicity, FIG. 5 shows direct paths from each base station antenna to the mobile station 80A. In reality, a crosstalk may exist between the signals transmitted from each base station antenna, such that the mobile station 80A receives a mixture of the signals. The crosstalk is resolved in part by a pre-coding method applied in the base station and in part by the mobile station receiver.

Figure 6:
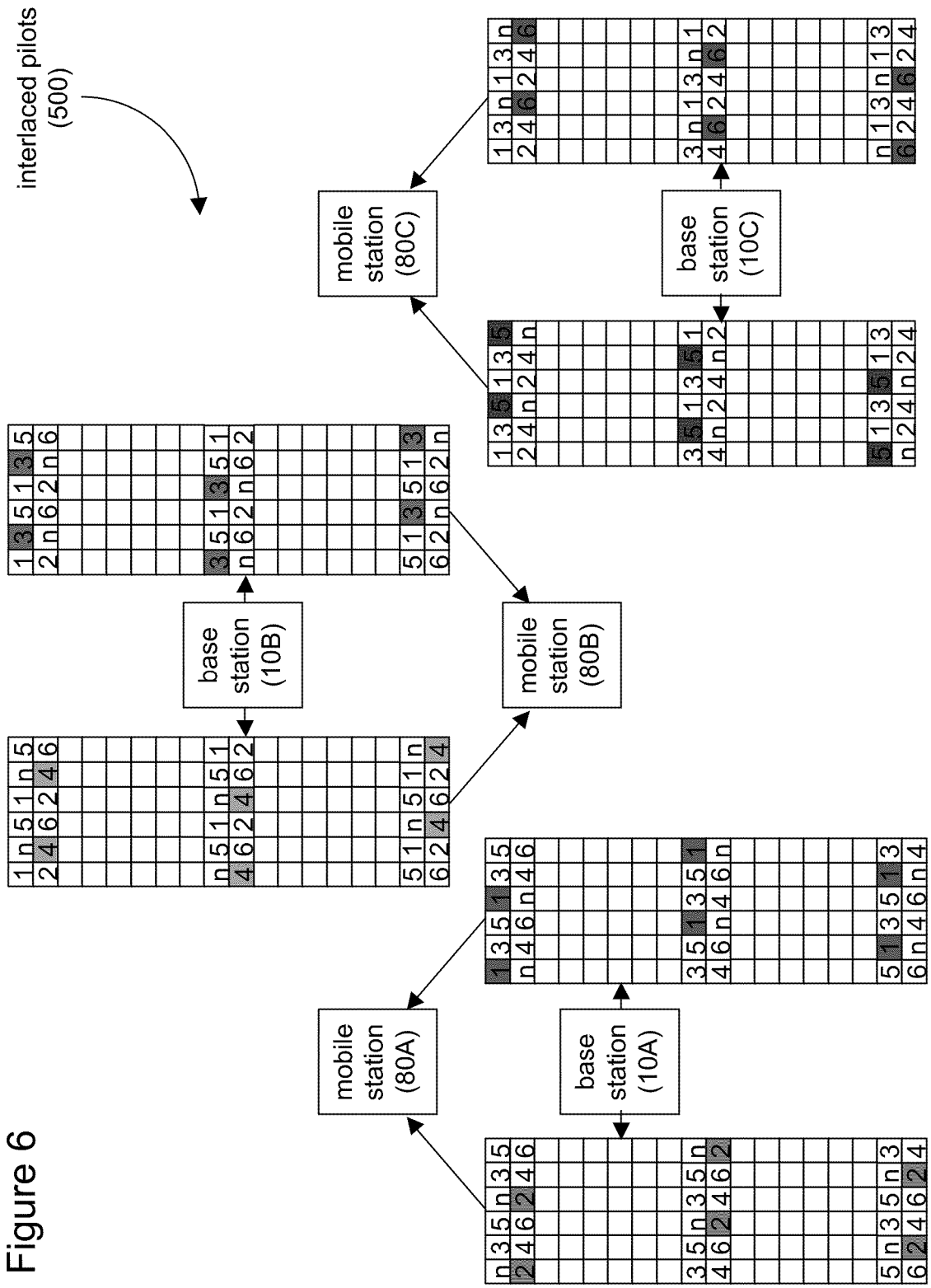
FIG. 6 is a block diagram illustrating the interlaced pilot sub-carrier feature of the pilot method of FIG. 1, according to some embodiments.

Another design criteria for the pilot method 100 is having interlaced pilot sub-carriers. FIG. 6 illustrates how three base stations 10A, 10B, and 10C may simultaneously use the clusters 50A, 50B, and 50C (FIG. 4) to each transmit to a single corresponding mobile station, according to some embodiments. By interlacing the pilot sub-carriers between different base stations 10, interference at the mobile stations 80 is less likely to occur.

Base station 10A, for example, would transmit the pilot sub-carrier 52 (slot 1, red), a null sub-carrier (slot 2), and sixteen data sub-carriers to a mobile station 80A (first symbol 30). Base station 10A would also transmit a null sub-carrier (slot 1), the pilot sub-carrier 54 (slot 2, orange), and sixteen data sub-carriers to the mobile station 80A. Similarly, base station 10B uses cluster 50B to service mobile station 80B and base station 10C uses cluster 50C to service mobile station 80C.

One benefit of having interlaced pilot sub-carriers is that, when the pilot sub-carriers are boosted, the signal-to-interference ratio (SINR) on the pilots improves (in contrast to non-interlaced pilots, where boosting the pilots does not change the SINR, as the interfering pilots are boosted as well). In the pilot method 100, there is a pilot separation between streams by different locations combined with nulls (perfect separation). There is also a pilot separation between the base stations by interlacing (selection from a fixed range of options). The pilot sub-carriers are also optimized for narrowband transmissions, in some embodiments.

Figure 7:
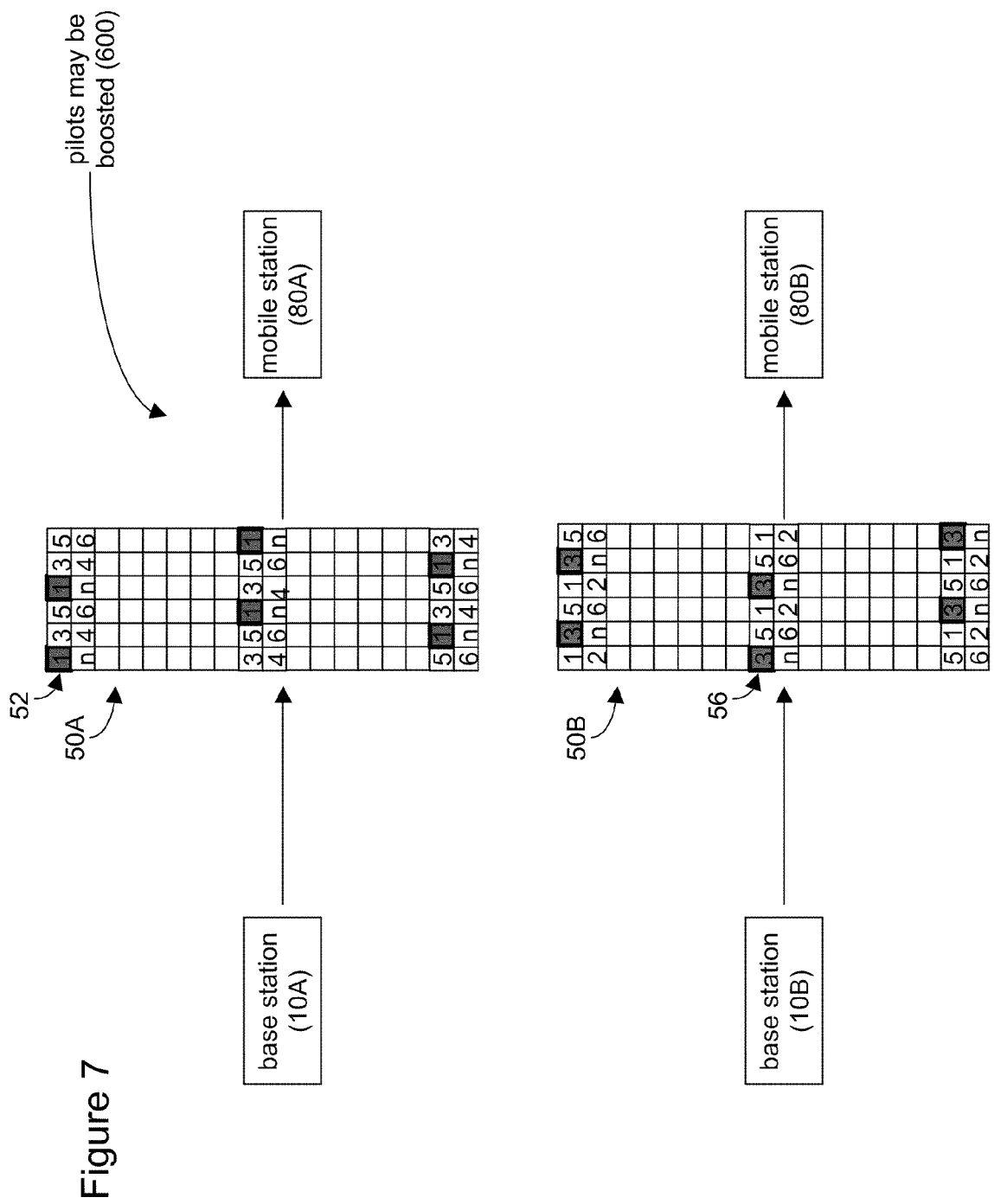
FIG. 7 is a block diagram illustrating the boosting feature of the pilot method of FIG. 1, according to some embodiments.
Figure 8:
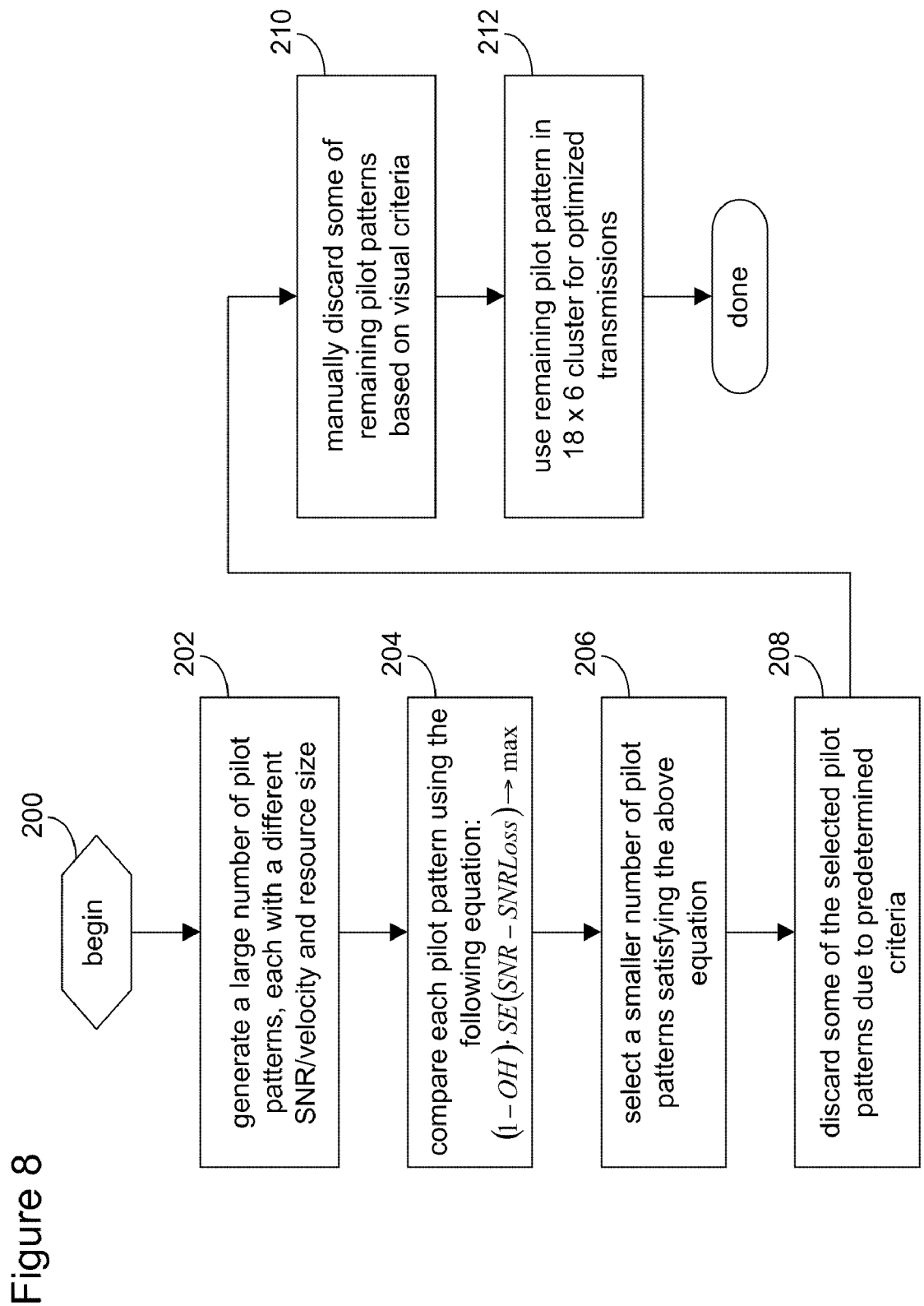
FIG. 8 is a flow diagram showing operations performed by the pilot method of FIG. 1 to generate clusters with optimal pilot patterns, according to some embodiments.

FIG. 7 illustrates the boosting feature of the pilot method 100, in some embodiments. In a partial view of the operations of FIG. 6, in FIG. 7, the base station 10A is using cluster 50A to transmit data to mobile station 80A while the base station 10B is using cluster 50B to transmit data to mobile station 80B. A thick line around the pilot sub-carriers 52 and 56 denotes boosting of the pilot sub-carriers. In the prior art, the same location would be used for the pilot sub-carriers for both operations. When base station 10A boosts its pilot sub-carrier 52, it would cause base station 10B to likely also boost its pilot sub-carrier 56. This would cause both mobile stations 80A and 80B to experience interference. In contrast, because different locations within the cluster 50 are used for each pilot sub-carrier, boosting is successful, since the pilot sub-carriers 52, 56 are located in different parts of the cluster 50.

Thus, in the pilot method 100, there is an equal density of pilot sub-carriers per OFDM symbol to minimize the power fluctuation and increase the power efficiency. The pilot method 100 also minimizes the power fluctuation across the antennas for multiple-antenna/multiple-stream transmission. The pilot pattern allocation is designed to support space frequency block coding (SFBC) by using pairs of pilot sub-carriers in the frequency domain.

The above-described design criteria are accomplished using the pilot pattern engine 200 (FIG. 1). In some embodiments, the pilot pattern engine 200 is a combination of automatic software and manual analysis, as described below. The design of pilot patterns in the cluster 50 affects the link-level performance of the cellular neighborhood 150: if there are too many pilot sub-carriers or the pilot sub-carriers are allocated too much energy, there will not be enough bandwidth or energy to transmit the data. On the other hand, if too small bandwidth and energy are allocated to the pilot sub-carriers, the performance will degrade as a result of poor channel estimation quality. Also, the placement of pilot sub-carriers within the cluster 50 are carefully chosen by the pilot pattern engine 200, in some embodiments, so as to enable channel estimation in both frequency and time dimensions.

In some embodiments, the pilot method 100 seeks to maximize spectral efficiency when designing the number of pilot sub-carriers, pilot locations and pilot boosting, considering pilot overhead and channel estimation loss. The following equation is used by the pilot method 100 to determine the pilot configuration:

$$(1-OH) \cdot SE(SNR-SNRLoss) \rightarrow max \quad (1)$$

where OH is the overhead of the pilot sub-carrier configuration in the cluster 50, SE is the spectral efficiency, SNR is the signal-to-noise ratio, and SNRLoss is the signal-to-noise ratio loss due to channel estimation errors. Equation (1) shows that, if the cluster 50 has many pilot sub-carriers, the overhead will be high (and 1−OH will be low), so the channel estimation ratio is likely to be good (low channel estimation loss), with a cost of more overhead. If, instead, the cluster 50 has few pilot sub-carriers, then the overhead is low, but the channel estimation loss is likely to be high. By maximizing the above equation, a balance is obtained that ensures low channel estimation loss with just the right number of pilot sub-carriers.

In some embodiments, the pilot pattern engine 200 models the channel estimation loss by using the error of a two-dimensional linear minimum mean squared error (LMMSE) estimator, translating the error to effective SNR, and summing the mean spectral efficiency over the active data sub-carriers. Boosting increases the power of the pilots and decreases the power of the data sub-carriers. In some embodiments, the overall power or the overall power of the strongest symbol is normalized. In some embodiments, the pilot method 100 uses spectral efficiency curves (for genie channel estimation), which are a smoothened version of link level simulation results. The spectral efficiency curves do not affect the design significantly, in some embodiments. Optimization is a function of SNR and velocity. However, in the pilot method 100, optimizing for high SNR is deemed to cover well both high and low SNR, and more or less so for velocity.

FIG. 8 is a flow diagram showing operations performed by the pilot pattern engine 200 to determine an optimum pilot configuration for the cellular environment 150. In some embodiments, the optimization is performed in two stages. In a first stage, a coarse brute-force search is conducted. In some embodiments, multiple computer-generated pilot patterns are compared for each SNR/velocity and resource size (block 202). The number of computer-generated pilot patterns may number a thousand or more, for example. Then, using equation (1) above, the pilot patterns are compared to one another (block 204), with the patterns approaching a maximum being preferred. Then, each pattern is optimized locally by attempting to create small changes in the location of pilots and choosing these changes which improve the design metrics.

In a second stage, the pilot pattern engine 200 conducts a more refined evaluation on the selected pilot patterns (block 206). This refined evaluation considers interference, constraints on symbol power fluctuations, interlacing and aesthetical considerations, to name a few examples. Some more pilot patterns are discarded during the second evaluation (block 208). While the software generates the pilot patterns based on equation (1), an individual may manually evaluate the remaining pilot patterns (block 210) based on visual criteria. A person evaluating the configuration may, for example, decide that the pilot configuration is not symmetrical enough or as balanced. The pilot pattern engine 200 then evaluates the loss in performance between the optimized pattern and the pattern chosen or modified by the user to aid the decision. Those pilot patterns that remain are used in the 18×6 cluster for optimized transmissions in the cellular environment 150 (block 212). The order of the above operations may differ from what is shown in FIG. 8. For example, the pilot patterns may be eliminated due to the design criteria (block 208) before using equation (1) to eliminate pilot patterns (block 204).

The pilot method 100 is distinguishable over prior art pilot sub-carrier designs. The pilot method 100 provides a unified pilot sub-carrier scheme for all modes, such as localized versus distributed, as well as the various MIMO modes. This enables a simplified system analysis and mobile station/base station implementation, as well as providing unified measurements modes, in some embodiments. Further, in the pilot method 100, the locations of pilot sub-carriers are interlaced, as described above. In prior art WiMAX-I designs, pilot sub-carriers hit with other pilot sub-carriers, which reduces performance in interference-limited cases, and may be the principle reason for losses. In the pilot method 100, the number of pilot sub-carriers increases with an increase in the number of streams 60, in some embodiments. In prior art WiMAX-I implementations, the pilot sub-carriers are divided between streams, which sometimes results in having too many pilot sub-carriers, other times results in too few pilot sub-carriers.

In contrast to prior art designs, the pilot method 100 provides a semi-automatic optimized number and locations of the pilot sub-carriers, with a tradeoff of implementation loss and overhead. In some embodiments, the pilot pattern engine 200 semi-automatically searches all locations for the pilot sub-carrier locations and tries different boosting values for the pilot sub-carriers, to understand how many pilot sub-carriers are needed in the searched environment. By performing these operations, the pilot search engine 200 is able to ascertain how much throughput will be obtained for the overhead cost.

In the pilot method 100, both dedicated pilot sub-carriers and common pilot sub-carriers are considered. Dedicated pilot sub-carriers are those pilot sub-carriers that are used for local channel estimation for a specific mobile device. Dedicated pilot sub-carriers may therefore be pre-coded, such as to carry information about the effective channel from the transmit data stream to the receive antenna (rather than about the physical channel from the transmit antenna to the receive antenna). Common pilot sub-carriers are shared between all mobile devices, and are used to estimate the physical channel, whereas the effective (pre-coded) channel is calculated by multiplying with a pre-coding matrix.

For a non-pre-coded equal power transmission, common pilot sub-carriers are usually more efficient than dedicated ones. However, for WiMAX-II, dedicated pilot sub-carriers are considered more efficient, in some embodiments, with respect to beamforming and pre-coding, fractional frequency reuse, MU-MIMO and pre-coded single-user closed-loop MIMO (SU-CL-MIMO), which is a generalization of beamforming, and interference mitigation, each of which is discussed below.

Using the pilot method 100, for beamforming and pre-coding (pre-coded MIMO/MU-MIMO), the common pilot sub-carriers limit the number of transmit antennas (to two or four) and require signaling of the chosen codeword. Each pre-coder is a matrix which weights the transmitted signal in the base station before transmission and in a way control its spatial direction. A list of pre-coders (known as a beamforming cookbook) is used for choosing the actual pre-coder (usually, at the recommendation of the mobile station). The common pilot sub-carriers are less efficient when beamforming is combined with downlink power control. Dedicated pilots allow more freedom in the selection of the number of antennas and the beamforming algorithm (base station optimization). On the other hand, common pilot sub-carriers require sounding (uplink and/or downlink) for closed loop in frequency division duplexing (to provide the feedback of the V matrix for each physical channel). Also, dedicated pilot sub-carriers enjoy the beamforming gain (since the pilot energy is focused toward the desired direction), which more than compensates for having a smaller effective number of pilot sub-carriers (compared to common pilot sub-carriers). Further, the number of pilot sub-carriers is determined by the number of transmit streams 60 (which is usually one or two), and not by the number of transmit antennas (which is usually between two and four), so the overhead is usually lower.

Using the pilot method 100, under fractional frequency reuse, the pilot sub-carriers that are boosted/deboosted with data sub-carriers are more efficient than pilots that have fixed boosting. Pilot sub-carrier quality matches data sub-carrier quality and pilot sub-carriers of boosted groups do not interfere with de-boosted groups. Also, dedicated pilot sub-carriers allow a precise estimation of carrier to interference-plus-noise ratio (CINR) of each FFR group (compared to indirect deduction of CINR with common pilot sub-carriers).

Using the pilot method 100, under multi-user and single-user CL MIMO (pre-coded), overlayed code division multi-plexing (CDM) pilot sub-carriers are used to reduce overhead to approximately 5.5%, in some embodiments. Also, with dedicated pilot sub-carriers, the demodulation is the same for two and four antennas, and the processing for CQI is simpler.

Using the pilot method 100 for interference mitigation, having dedicated pilot sub-carriers enables instantaneous interference estimation for receiver interference cancellation, which is not accurate in common pilot sub-carriers if interference is pre-coded.

In some embodiments, multiple patterns are used to allow interference averaging either by randomization or planning. This avoids having a larger interference level on the pilot sub-carriers due to the pilot boosting, which may void the pilot boosting gain for interference-limited cases. For example, in some embodiments, the pilot method 100 uses two patterns per sector (MIMO 2×2), and three sets, for a total of six patterns. The pilot patterns include pilot sub-carriers on the last symbol of the cluster. The pilot sub-carriers will be punctured when the sub-frame is shortened. For support of MU-MIMO, an overlay of pilot sub-carriers (under code division multiplexing, CDM) is to be considered when the cross-talk level is low, thus leading to a reduced pilot sub-carrier overhead. For example, in some embodiments, using the pilot method 100, two users with multi-user MIMO can use the locations of a single pilot stream and have a total overhead of 5.5%.

The boosting value is the difference between pilot sub-carrier power and data power. The optimal boosting values are based on an optimization target defined above for the white noise case, but are also good for interference (where the interferer uses a similar pilot pattern).

Four Antennas

Where the base station 10 includes four antennas, in some embodiments, the pilot method 100 uses a cluster in which pilot sub-carriers reside on the first two and last two symbols 30, but not the middle two symbols. In other words, pilot sub-carriers reside on symbols 1, 2, n−1, and n, out of n=6 symbols. Further, there are an equal number of pilot sub-carriers per antenna for each of the symbols that are populated with pilots. Thus, symbols 1, 2, n−1, and n would have four pilot sub-carriers when there are four antennas. Finally, the pilot sub-carriers are somewhat evenly distributed through the cluster. In some embodiments, with four pilot sub-carriers per antenna, a 14.8% pilot overhead results ($^{16}/_{108}$).

Sometimes, the six-OFDM symbol frame needs to be shortened by one symbol to accommodate the preamble, or to meet the uplink-downlink switch time. In this case, clusters 50A, 50B, and 50C (FIG. 4) will shorten the pilot together with the data sub-carrier. For the cluster 50B, since more pilots are put on the first and the last OFDM symbol, performance degradation may be large. Therefore, in some embodiments, a shortened cluster 50B is designed which employs a separate filter design for this special case.

Uplink Pilot Design

Figure 9:
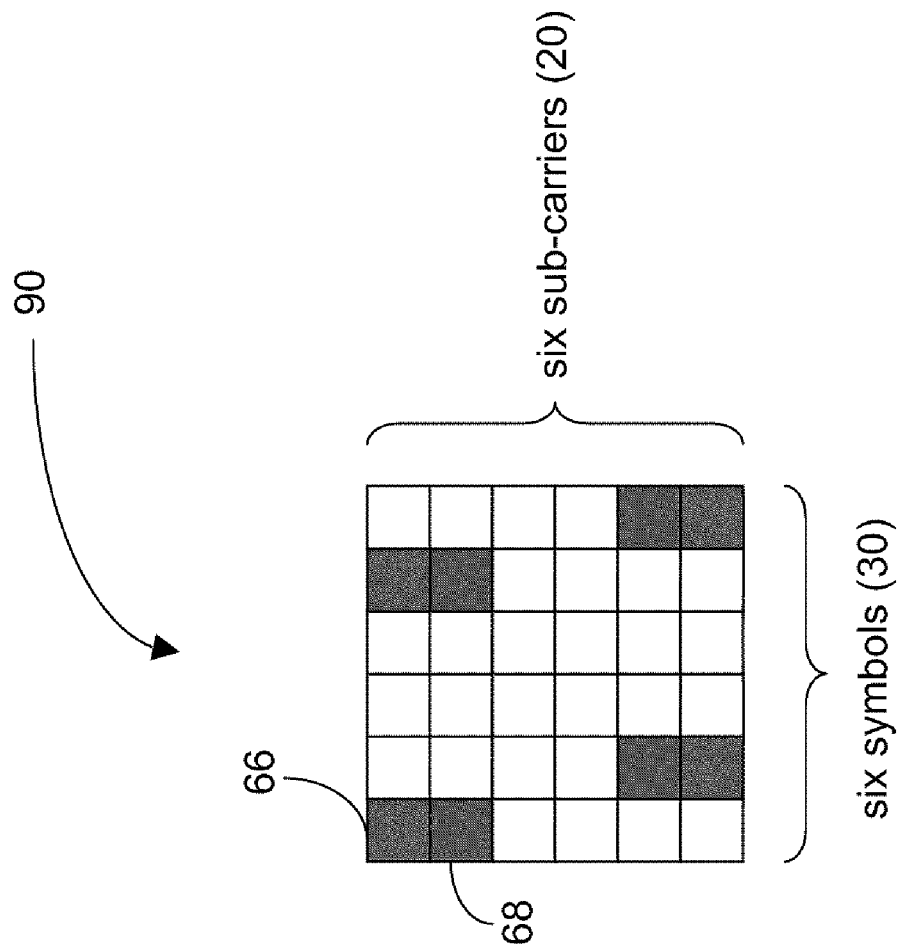
FIG. 9 is a diagram of a 6×6 cluster used by the pilot method of FIG. 1 for uplink transmissions, according to some embodiments.

The same pilot method 100 is used for uplink pilot design, while applied to different size of clusters/tile (6×6 or 4×6). For example, FIG. 9 is a diagram of a 6×6 cluster 90, used by the pilot method 100 for uplink transmissions, according to some embodiments. The cluster 90 features six symbol periods 30 and six sub-carriers 20 per symbol period. The first symbol period includes two pilot sub-carriers 66, 68 (red and blue, respectively) in the first two sub-carrier positions, with the remaining four sub-carriers being used for data transmission. In the second symbol period, the pilot sub-carriers 66, 68 are in the last two sub-carrier positions. The center two symbol periods 30 include no pilot sub-carriers. The fifth symbol period is identical to the first symbol period. The sixth symbol period is identical to the second symbol period. As FIG. 9 illustrates, the pilot sub-carriers are again positioned in a somewhat symmetrical and distributed manner, such that no data sub-carrier is very far from one of the pilot sub-carriers.

This ensures that the data sub-carriers are somewhat correlated to one of the pilot sub-carriers, enabling better channel estimation. Further, the optimum design criteria of downlink transmissions are also found in the cluster 90 used for uplink transmissions, namely, the equal pilot density per OFDM symbol, the cluster being optimized for narrow band channel estimation to support MIMO and FFR partition schemes, the interlaced characteristic of the pilots, and the pilot boosting capability.

For uplink transmissions, there are different tile shapes (frequency×time) resulting from different transmission schemes: localized, diversity and hopping.

Localized: the pilot method 100 uses the same design as for the downlink, as described above Distributed: the pilot method 100 uses the pilot pattern shown in FIG. 9. For a single stream 60, there are three pilot sub-carriers (for a 25% overhead). This arrangement supports randomization of times two only. In some embodiments, even without randomization, the arrangement is superior to prior art arrangements. For two streams 60, the WiMAX-1 cooperative spatial multiplexing (CSM) structure is used by the pilot method 100 for 4×3 clusters, since it does not require randomization (equal power per sub-carrier)

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method comprising:
generating a number of clusters by a base station in a cellular neighborhood, the cellular neighborhood further comprising a plurality of mobile stations, wherein transmissions between the base station and any of the plurality of mobile stations take place over a channel, each cluster having one or more pilot sub-carriers per orthogonal frequency division multiplexing (OFDM) symbol;
comparing a spectral efficiency of each generated cluster, wherein the following formula is used to identify one or more clusters approaching a maximum:

$$(1-OH) \cdot SE(SNR-SNRLoss) \rightarrow max,$$

where OH is an overhead of a pilot sub-carrier configuration in the cluster, SE is the spectral efficiency, SNR is the signal-to-noise ratio, and SNRLoss is the signal-to-noise ratio loss due to channel estimation errors;
selecting a smaller number of clusters from the generated clusters by the base station based on the comparison; and
repeatedly discarding the smaller number of clusters by the base station, until a final cluster remains; and
using the final cluster generated by the base station to transmit data over the channel to one or more of the plurality of mobile stations.

2. The method of claim 1, repeatedly discarding the smaller number of clusters further comprising:
discarding some of the smaller number of clusters based on predetermined design criteria.

3. The method of claim 2, discarding some of the smaller number of clusters based on predetermined design criteria further comprising:
discarding some of the smaller number of clusters that do not have equal pilot density per OFDM symbol.

4. The method of claim 2, discarding some of the smaller number of clusters based on predetermined design criteria further comprising:
discarding some of the smaller number of clusters that are not optimized for narrowband channel estimation.

5. The method of claim 2, discarding some of the smaller number of clusters based on predetermined design criteria further comprising:
discarding some of the smaller number of clusters that do not have interlaced pilot sub-carriers.

6. The method of claim 2, discarding some of the smaller number of clusters based on predetermined design criteria further comprising:
discarding some of the smaller number of clusters that will not allow the base station to boost the pilot sub-carriers.

7. The method of claim 1, repeatedly discarding the smaller number of clusters further comprising:
manually discarding some of the smaller number of clusters based on visual criteria.

8. A method comprising:
generating a plurality of pilot patterns by a base station in a cellular neighborhood, the cellular neighborhood further comprising a plurality of mobile stations, wherein transmissions between the base station and any of the plurality of mobile stations take place over a channel, each pilot pattern comprising a predetermined spectral efficiency and at least two pilot sub-carriers;
comparing the plurality of pilot patterns to one another based on a spectral efficiency of each, wherein, for each of the plurality of pilot patterns, the following formula is used:

$$(1-OH) \cdot SE(SNR-SNRLoss) \rightarrow max,$$

where OH is an overhead of a pilot sub-carrier configuration in the pilot pattern, SE is the spectral efficiency, SNR is the signal-to-noise ratio, and SNRLoss is the signal-to-noise ratio loss due to channel estimation errors;
eliminating, by the base station, a predetermined number of pilot patterns having the lowest spectral efficiency from the plurality of pilot patterns; and
the base station using one of the not eliminated pilot patterns for optimized downlink transmissions to one or more of the plurality of mobile stations, wherein the one not eliminated pilot pattern is transmitted over the channel.

9. The method of claim 8, eliminating from the plurality of pilot patterns those pilot patterns that do not satisfy predetermined design criteria further comprising:
eliminating those pilot patterns that do not have an equal pilot sub-carrier density per symbol for those OFDMA symbols with pilots.

10. The method of claim 8, eliminating from the plurality of pilot patterns those pilot patterns that do not satisfy predetermined design criteria further comprising:
eliminating those pilot patterns that are not optimal for narrowband channel estimation.

11. The method of claim 8, eliminating from the plurality of pilot patterns those pilot patterns that do not satisfy predetermined design criteria further comprising:
eliminating those pilot patterns that do not have interlaced pilot sub-carriers when applicable.

12. A method comprising:
generating a plurality of pilot patterns by a base station in a cellular neighborhood, the cellular neighborhood further comprising a plurality of mobile stations, each pilot pattern comprising a predetermined spectral efficiency and at least two pilot sub-carriers;

comparing the plurality of pilot patterns to one another based on a spectral efficiency of each, wherein the following formula is used for each of the plurality of pilot patterns:

$$(1-OH) \cdot SE(SNR-SNRLoss) \rightarrow max,$$

where OH is an overhead of a pilot sub-carrier configuration in the pilot pattern, SE is the spectral efficiency, SNR is the signal-to-noise ratio, and SNRLoss is the signal-to-noise ratio loss due to channel estimation errors;

eliminating a predetermined number of pilot patterns having the lowest spectral efficiency from the plurality of pilot patterns; and using one of the not eliminated pilot patterns for optimized uplink transmissions from one or more of the plurality of mobile stations to the base station, wherein the uplink transmission takes place over a channel.

13. The method of claim 12, eliminating from the plurality of pilot patterns those pilot patterns that do not satisfy predetermined design criteria further comprising:

eliminating those pilot patterns that do not have an equal pilot sub-carrier density per symbol for those OFDMA symbols with pilots.

14. The method of claim 12, eliminating from the plurality of pilot patterns those pilot patterns that do not satisfy predetermined design criteria further comprising:

eliminating those pilot patterns that are not optimal for narrowband channel estimation.

15. The method of claim 12, eliminating from the plurality of pilot patterns those pilot patterns that do not satisfy predetermined design criteria further comprising:

eliminating those pilot patterns that do not have interlaces pilot sub-carriers when applicable.

* * * * *